(12) United States Patent
Inoue et al.

(10) Patent No.: US 11,017,226 B2
(45) Date of Patent: May 25, 2021

(54) IMAGE PROCESSING SYSTEM, IMAGE PROCESSING METHOD, AND STORAGE MEDIUM

(71) Applicant: NEC Corporation, Tokyo (JP)

(72) Inventors: Mamoru Inoue, Tokyo (JP); Jinit Bhatt, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/485,594

(22) PCT Filed: Aug. 30, 2018

(86) PCT No.: PCT/JP2018/032052
§ 371 (c)(1),
(2) Date: Aug. 13, 2019

(87) PCT Pub. No.: WO2019/044944
PCT Pub. Date: Mar. 7, 2019

(65) Prior Publication Data
US 2020/0184186 A1    Jun. 11, 2020

(30) Foreign Application Priority Data

Aug. 30, 2017  (JP) .............................. JP2017-165404

(51) Int. Cl.
*G06K 9/00* (2006.01)
*G06K 9/42* (2006.01)

(52) U.S. Cl.
CPC ....... *G06K 9/0061* (2013.01); *G06K 9/00617* (2013.01); *G06K 9/42* (2013.01)

(58) Field of Classification Search
CPC .. G06F 21/32; G06K 9/00604; G06K 9/0061; G06K 9/00617; G06K 9/00597; G06K 9/42; G06K 9/342; G06K 9/2027; G06K 9/4628; G06K 9/6274; G02C 7/046; G06T 7/00
USPC ............................................ 382/117; 348/78
See application file for complete search history.

(56) References Cited

U.S. PATENT DOCUMENTS

| | | | |
|---|---|---|---|
| 5,572,596 | A | 11/1996 | Wildes et al. |
| 5,751,836 | A | 5/1998 | Wildes et al. |
| 6,714,665 | B1 | 3/2004 | Hanna et al. |
| 10,380,421 | B2 * | 8/2019 | Santos-Villalobos ........................ G06K 9/00604 |

(Continued)

FOREIGN PATENT DOCUMENTS

| | | |
|---|---|---|
| CA | 2794659 A1 | 11/2011 |
| EP | 1126403 A2 | 8/2001 |
| EP | 2570969 A1 | 3/2013 |

(Continued)

OTHER PUBLICATIONS

European Communication Pursuant to Rule 164(1) EPC issued in European Patent Application No. 18851326.1, dated Jul. 3, 2020, 16 pages.

(Continued)

*Primary Examiner* — Charlotte M Baker

(57) ABSTRACT

An example embodiment includes: an extraction unit that extracts a determination object image including a side part of an outer circumference of an iris from an image including an eye; and a determination unit that determines whether or not a colored contact lens is worn based on the determination object image.

12 Claims, 11 Drawing Sheets

(56) References Cited

U.S. PATENT DOCUMENTS

2013/0194407 A1    8/2013    Kim et al.

FOREIGN PATENT DOCUMENTS

| | | |
|---|---|---|
| JP | 2000-194856 A | 7/2000 |
| JP | 2002-279402 A | 9/2002 |
| JP | 2004-206444 A | 7/2004 |
| JP | 2006-302276 A | 11/2006 |
| JP | 2006-343995 A | 12/2006 |
| JP | 2013-522754 A | 6/2013 |
| WO | WO-96/007978 A1 | 3/1996 |

OTHER PUBLICATIONS

Gragnaniello, Diego et al: "Using iris and sclera for detection and classification of contact lenses", Pattern Recognition Letters, XP029797378, vol. 82, Oct. 15, 2016 (Oct. 15, 2016), pp. 251-257.

Yuqing He et al: "Liveness iris detection method based on the eye's optical features", SPIE—International Society for Optical Engineering. Proceedings, XP055708075, vol. 7838, Oct. 7, 2010 (Oct. 7, 2010), 9 pages.

He, Zhaofeng et al: "Efficient Iris Spoof Detection via Boosted Local Binary Patterns", Jun. 2, 2009 (Jun. 2, 2009), XP047468556, Pervasive: International Conference on Pervasive Computing; [Lecture Notes in Computer Science; Lect.Notes Computer], Springer, Berlin, Heidelberg, pp. 1080-1090.

Gupta, Priyanshu et al: "On Iris Spoofing Using Print Attack", International Conference on Pattern Recognition, IEEE Computer Society, XP032698040, US, Aug. 24, 2014 (Aug. 24, 2014), pp. 1681-1686.

International Search Report corresponding to PCT/JP2018/032052 dated Dec. 4, 2018 (5 pages).

Extended European Search Report issued in European Patent Application No. 18851326.1, dated Oct. 28, 2020, 15 pages.

Dexin Zhang, et al. "Personal identification based on iris texture analysis", IEEE Transactions on Pattern Analysis and Machine Intelligence, XP011103920, vol. 25, No. 12, Dec. 1, 2003 (Dec. 1, 2003), pp. 1519-1533 (15 pages).

Kang Ryoung Park "Robust Fake Iris Detection", Articulated Motion and Deformable Objects Lecture Notes in Computer Science; XP019037053, Jan. 1, 2006 (Jan. 1, 2006), pp. 10-18 (9 pages).

* cited by examiner

Fig. 5
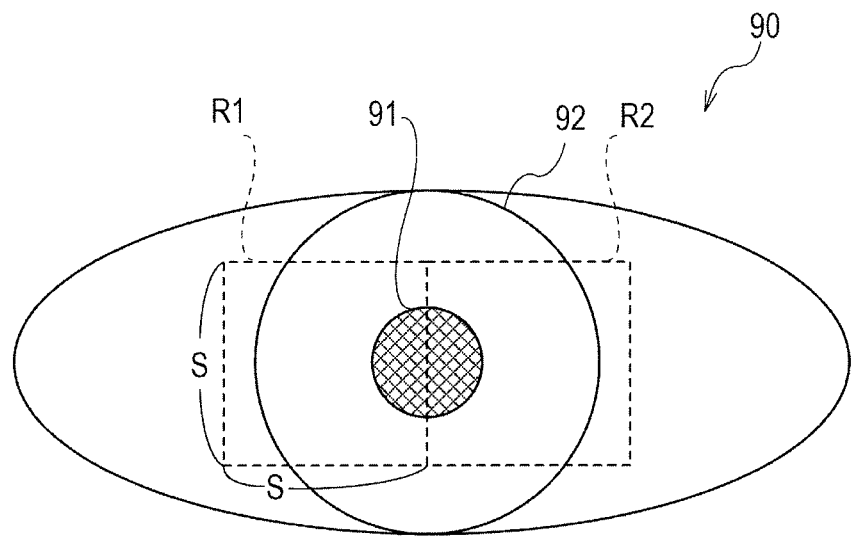
Fig. 6
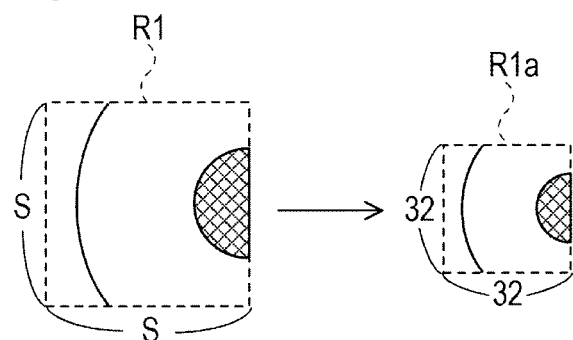
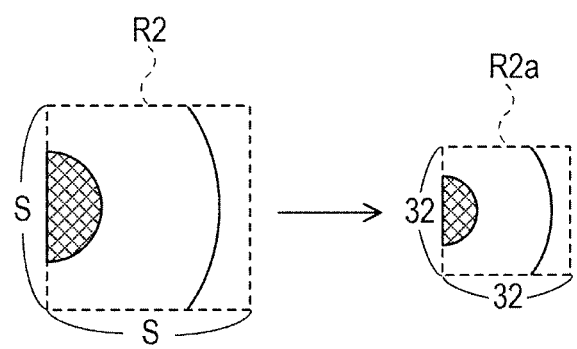

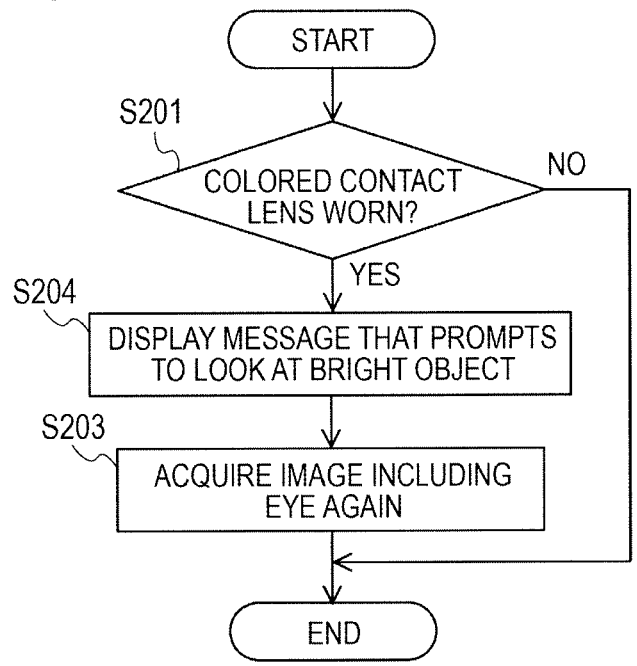
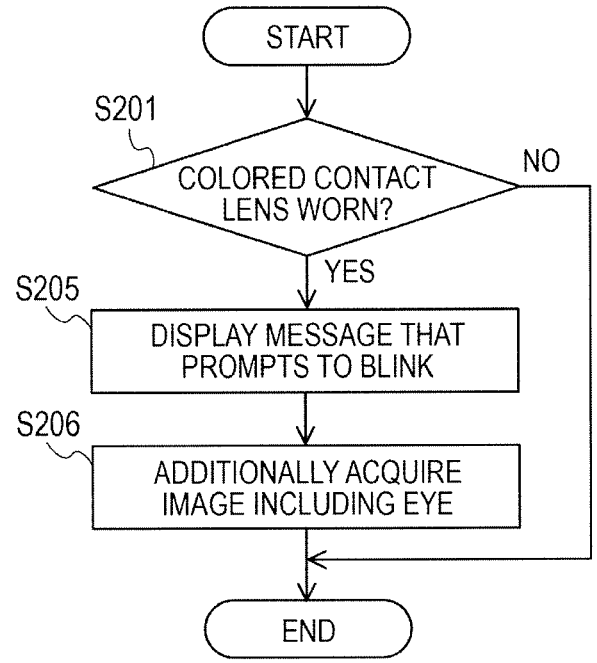

IMAGE PROCESSING SYSTEM, IMAGE PROCESSING METHOD, AND STORAGE MEDIUM

CROSS REFERENCE-TO RELATED APPLICATIONS

This application is a national stage application of International Application No. PCT/JP2018/032052 entitled "Image Processing System, Image Processing Method, and Storage Medium" filed on Aug. 30, 2018, which claims priority to Japanese Patent Application No. 2017-165404 filed on Aug. 30, 2017, the disclosures of which are hereby incorporated by reference in their entirety.

TECHNICAL FIELD

The present invention relates to an image processing system, an image processing method, and a storage medium.

BACKGROUND ART

Patent Literature 1 discloses an individual authentication method using an iris image. In such an individual authentication method, a mask region is set under an upper eyelid, an image of an iris region excluding the mask region is used for authentication, and thereby eyelashes less affect the authentication accuracy.

CITATION LIST

Patent Literature

[PTL 1] Japanese Patent Application Laid-Open No. 2004-206444

SUMMARY OF INVENTION

Technical Problem

In recent years, colored contact lenses in which a colored region is provided to a part of the contact lens have been commercially available. A colored contact lens on an eye provides a decorative effect that changes the color of an iris or makes an iris appear larger, and thus colored contact lenses have spread through the market.

In recognition of an iris as disclosed in Patent Literature 1, when the recognition subject wears colored contact lenses, appearance of a part of an iris changes. Thus, in order to perform appropriate matching, it is necessary to detect whether or not the colored contact lenses are worn.

The present invention has been made in view of the above problem and intends to provide an image processing system, an image processing method, and a storage medium that can accurately determine whether or not a recognition subject wears colored contact lenses.

Solution to Problem

According to one example aspect of the present invention, provided is an image processing system including: an extraction unit that extracts a determination object image including a side part of an outer circumference of an iris from an image including an eye; and a determination unit that determines whether or not a colored contact lens is worn based on the determination object image.

According to another example aspect of the present invention, provided is an image processing method including: extracting a determination object image including a side part of an outer circumference of an iris from an image including an eye; and determining whether or not a colored contact lens is worn based on the determination object image.

According to yet another example aspect of the present invention, provided is a storage medium in which a program is stored, the program causing a computer to execute: extracting a determination object image including a side part of an outer circumference of an iris from an image including an eye; and determining whether or not a colored contact lens is worn based on the determination object image.

Advantageous Effects of Invention

According to the present invention, an image processing system, an image processing method, and a storage medium that can accurately determine whether or not a recognition subject wears colored contact lenses can be provided.

BRIEF DESCRIPTION OF DRAWINGS

FIG. 5 is a diagram schematically illustrating extraction of determination object images according to the first example embodiment.

FIG. 6 is a diagram schematically illustrating change of the size of a determination object image according to the first example embodiment.

FIG. 9 is a flowchart illustrating a second example of a matching accuracy improvement process according to the first example embodiment.

FIG. 10 is a flowchart illustrating a third example of a matching accuracy improvement process according to the first example embodiment.

DESCRIPTION OF EMBODIMENTS

Figure 1:
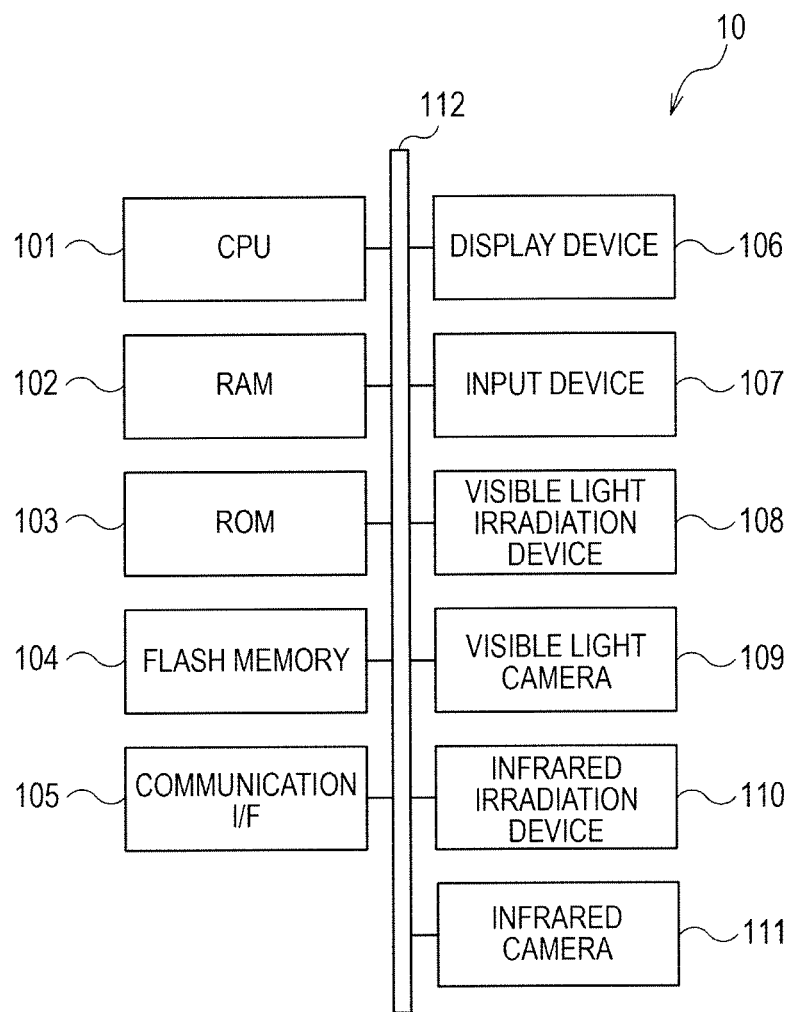
FIG. 1 is a block diagram illustrating a hardware configuration example of an iris recognition system according to a first example embodiment.

Example embodiments of the present invention will be described below with reference to the drawings. Throughout the drawings, the same elements or corresponding elements are labeled with the same reference numerals, and the description thereof may be omitted or simplified.

First Example Embodiment

FIG. 1 is a block diagram illustrating a hardware configuration example of an iris recognition system 10 that performs matching of an iris according to a first example embodiment of the present invention. The iris recognition system 10 may be a computer or an information communication terminal such as a mobile phone, a smartphone, a tablet personal computer (PC), a laptop PC, a desktop PC, or the like, for example. The iris recognition system 10 has a function of iris matching that is a sort of biometric matching. The iris recognition system 10 performs iris matching by capturing an image of an iris of a user that is a recognition subject and matching it against a registered iris image. The pattern of an iris that adjust an aperture of a pupil is unique and permanent. Thus, identity verification is possible by matching the iris pattern acquired at matching against an iris image that has been registered in advance. In the following description, it is assumed that the iris recognition system 10 is mounted on a smartphone as an example and iris matching is performed for identity verification in a situation of user login, however, the iris recognition system 10 is not limited thereto.

The iris recognition system 10 has a central processing unit (CPU) 101, a random access memory (RAM) 102, a read only memory (ROM) 103, and a flash memory 104 in order to implement a function as a computer performing calculation and storage. Further, the iris recognition system 10 has a communication interface (I/F) 105, a display device 106, an input device 107, a visible light irradiation device 108, a visible light camera 109, an infrared irradiation device 110, and an infrared camera 111. The CPU 101, the RAM 102, the ROM 103, the flash memory 104, the communication I/F 105, the display device 106, the input device 107, the visible light irradiation device 108, the visible light camera 109, the infrared irradiation device 110, and the infrared camera 111 are connected to each other via a bus 112. Note that the display device 106, the input device 107, the visible light irradiation device 108, the visible light camera 109, the infrared irradiation device 110, and the infrared camera 111 may be connected to the bus 112 via a drive device (not illustrated) used for driving these devices.

While these components forming the iris recognition system 10 are illustrated as an integrated device in FIG. 1, some of these functions may be formed by an externally attached device. For example, the visible light irradiation device 108, the visible light camera 109, the infrared irradiation device 110, or the infrared camera 111 may be an externally attached device which is different from a part forming the function of the computer including the CPU 101 and the like.

The CPU 101 has a function of performing a predetermined operation according to a program stored in the ROM 103, the flash memory 104, or the like and controlling respective components of the iris recognition system 10. The RAM 102 is formed of a volatile storage medium and provides a temporary memory area required for the operation of the CPU 101. The ROM 103 is formed of a non-volatile storage medium and stores necessary information such as a program used for the operation of the iris recognition system 10. The flash memory 104 is a storage device that is formed of a non-volatile storage medium and stores an image captured by the infrared camera 111 or the like, an image of a recognition subject, feature amount data, or the like.

The communication I/F 105 is a communication interface in accordance with a standard such as Wi-Fi (registered trademark), 4G, or the like and also is a module for communicating with other devices. The display device 106 is a liquid crystal display, an organic light emitting diode (OLED) display, or the like and used for displaying a moving image, a static image, a text, or the like. The input device 107 is a button, a touch panel, or the like and is used for user operation of the iris recognition system 10. The display device 106 and the input device 107 may be integrally formed as a touchscreen.

The visible light irradiation device 108 and the visible light camera 109 are provided on a display surface or the like of the display device 106, for example. The visible light irradiation device 108 is used as a light source used for capturing by the visible light camera 109, for example. Further, in a part of the process, the visible light irradiation device 108 may be used as a visible light irradiation unit which performs a process of irradiating the user's eye with a visible light to induce a pupillary light reflex and thereby causing the pupil to contract. The visible light camera 109 can capture a landscape, a user's face, a user's eye, or the like by using a visible light to acquire an image. A digital camera with a Complementary Metal Oxide Semiconductor (CMOS) image sensor, a Charge Coupled Device (CCD) image sensor, or the like may be used for the visible light camera 109 so as to be suitable for image processing after capturing.

The infrared irradiation device 110 is a light emitting element such as an infrared LED that emits an infrared light. A digital camera with a CMOS image sensor, a CCD image sensor, or the like having a light receiving element configured to have a sensitivity to an infrared ray may be used for the infrared camera 111. By irradiating the user's eye with an infrared light from the infrared irradiation device 110 and capturing an infrared ray reflected from an iris by using the infrared camera 111, it is possible to capture an iris image used for iris matching. By acquiring an iris image by using an infrared ray, it is possible to obtain a high contrast image regardless of the color of the iris and reduce influence of reflection at a cornea. When such influence does not matter, however, the visible light camera 109 may be used to capture an iris image. In this case, the infrared irradiation device 110 and the infrared camera 111 may be omitted. Further, when the visible light camera is a camera capable of acquiring an image by using an infrared ray in addition to a visible light, the infrared camera 111 may be omitted. Note that the wavelength of the infrared ray emitted from the infrared irradiation device 110 may be a near infrared region around 800 nm, for example.

Note that the hardware configuration illustrated in FIG. 1 is an example, and other devices than the above may be added or some of the above devices may not be provided. Further, some of the above devices may be replaced with another device having the same function. Furthermore, some of the functions may be provided by another device via a network or may be implemented by the function forming the present example embodiment being distributed to a plurality of devices. For example, the flash memory 104 may be replaced with a hard disk drive (HDD) or may be replaced with cloud storage.

Figure 2:
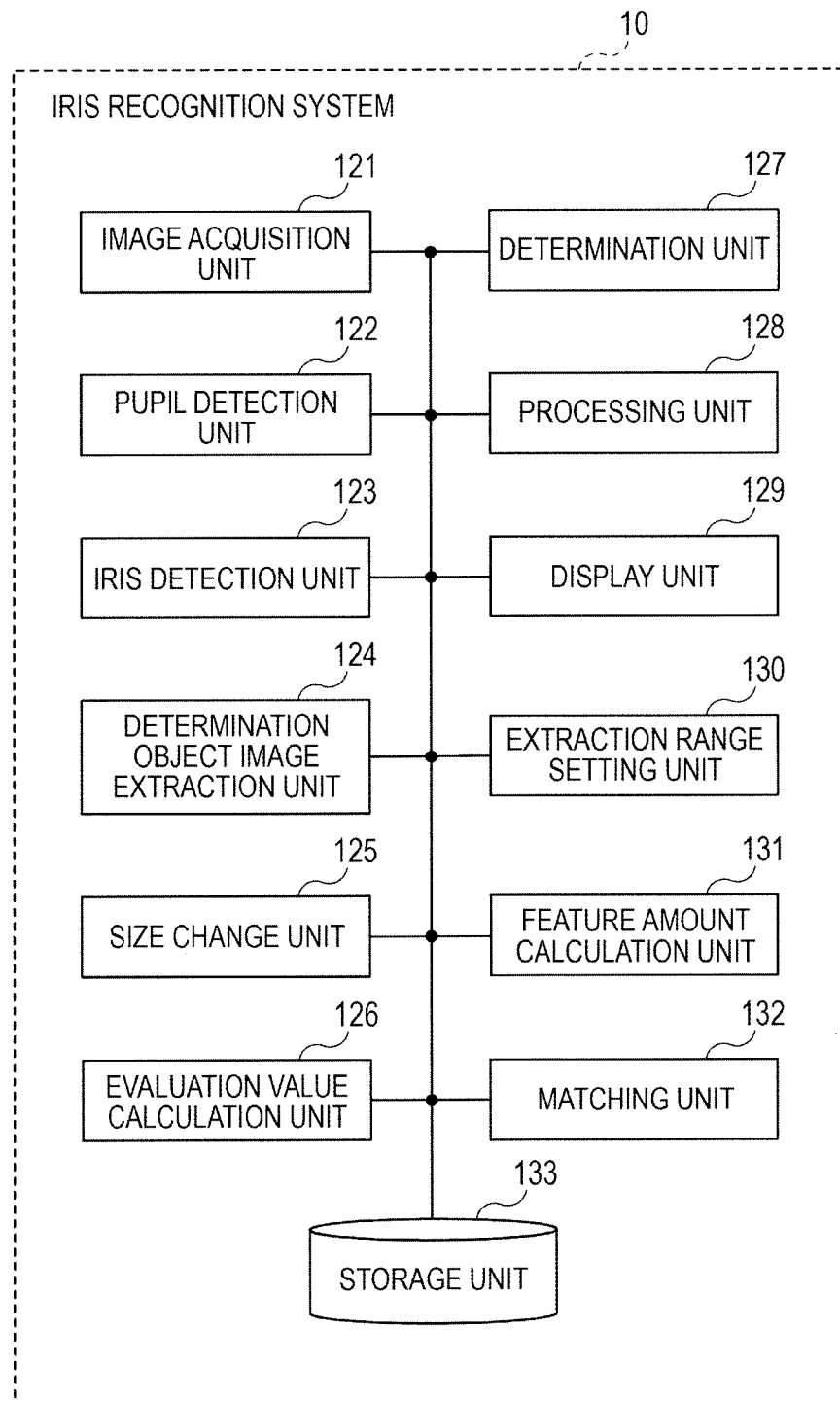
FIG. 2 is a function block diagram of the iris recognition system according to the first example embodiment.

FIG. 2 is a function block diagram of the iris recognition system 10 according to the first example embodiment. The iris recognition system 10 has an image acquisition unit 121, a pupil detection unit 122, an iris detection unit 123, a determination object image extraction unit 124, a size change unit 125, an evaluation value calculation unit 126, a determination unit 127, a processing unit 128, a display unit 129, an extraction range setting unit 130, a feature amount calculation unit 131, a matching unit 132, and a storage unit 133.

The CPU 101 implements the function of the image acquisition unit 121 that acquires an infrared image of a user's eye by controlling the infrared irradiation device 110 and the infrared camera 111. The CPU 101 implements the function of the pupil detection unit 122, the iris detection unit 123, the determination object image extraction unit 124, the size change unit 125, the evaluation value calculation unit 126, the determination unit 127, the processing unit 128, the extraction range setting unit 130, the feature amount calculation unit 131, and the matching unit 132 by loading a program stored in the ROM 103 or the like to the RAM 102 and executing it. The process performed by each of these units will be described later. The display unit 129 displays the acquired image, a message to the user, or the like. The CPU 101 implements the function of the display unit 129 by controlling the display device 106. The storage unit 133 stores data of an iris image acquired by the image acquisition unit 121, iris images registered in advance, feature amounts calculated from these iris images, or the like. The CPU 101 implements the function of the storage unit 133 by controlling the flash memory 104.

Figure 3:
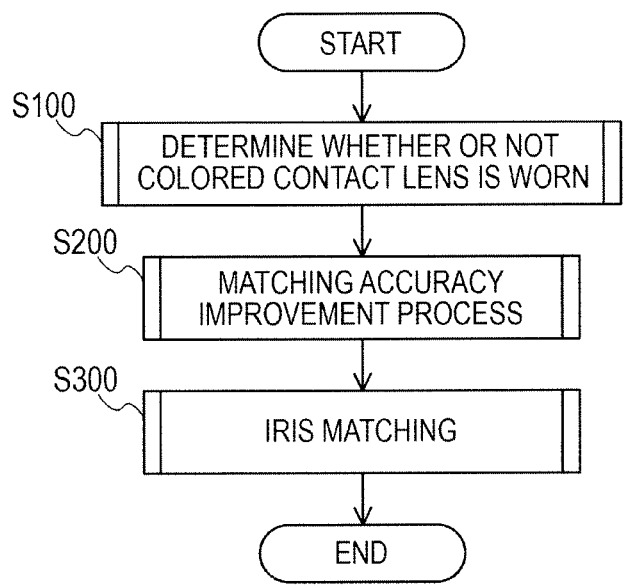
FIG. 3 is a flowchart illustrating a summary of a process performed by the iris recognition system according to the first example embodiment.

FIG. 3 is a flowchart illustrating summary of the process performed by the iris recognition system 10 according to the first example embodiment. In step S100, based on the image including the user's eye, the iris recognition system 10 determines whether or not the user's eye wears a colored contact lens.

A colored contact lens is a contact lens in which a colored part is provided to a part of a lens. A colored contact lens may be referred to as a color contact lens, a circle contact lens, or a cosmetic contact lens. A colored contact lens worn on an eye can provide a decorative effect that changes the color of an iris or makes an iris appear larger. In many cases, a colored region of a colored contact lens is mainly provided to a portion corresponding to a part near the outer circumference of the iris, and a portion corresponding to the pupil is colorless. This is for not losing a field of view while obtaining a decorative effect that makes an iris appear larger.

When a user wears a colored contact lens, a change in the pattern or the like of an iris may affect the accuracy of iris matching. Usually, registration of an iris image is performed without a colored contact lens being worn. This is because, when matching is performed with a colored contact lens being worn, the pattern of the iris at registration and the pattern of the iris at the matching are not matched. Thus, in step S100, prior to the iris matching, determination as to whether or not a colored contact lens is worn is performed based on an image including the user's eye. The content of the subsequent process can be made more suitable based on whether or not a colored contact lens is worn.

In step S200, the iris recognition system 10 performs a process for improving matching accuracy. This process is performed for reducing deterioration in accuracy of iris matching due to the colored contact lens if it is determined that a colored contact lens is worn mainly in step S100.

In step S300, the iris recognition system 10 matches an image including the user's iris captured at the matching against an image including a user's iris registered in advance. In the matching process in this step, the content of the process can be changed in accordance with the result of determination in step S100 as to whether or not a colored contact lens is worn. If a colored contact lens is worn, the iris recognition system 10 performs matching of the iris by using a feature amount extracted from a region which excludes a predetermined range including the outer circumference of the iris out of the region of the iris included in the image.

It is not essential to perform all the processes from step S100 to step S300 illustrated in FIG. 3, and an example embodiment in which a part of the above processes is omitted is included in the scope of the present invention. For example, the matching accuracy improvement process of step S200 may be omitted to simplify the process. Further, the process of step S100 may be omitted to simplify the process by determining in advance whether or not a colored contact lens is worn by using another device or instructing the user to input whether or not wearing a colored contact lens. Further, an image processing system that alone performs a process of determining whether or not a colored contact lens is worn in step S100 is also included in the scope of the present invention. Further, the process from step S100 to step S300 may be performed in cooperation of a plurality of devices.

Figure 4:
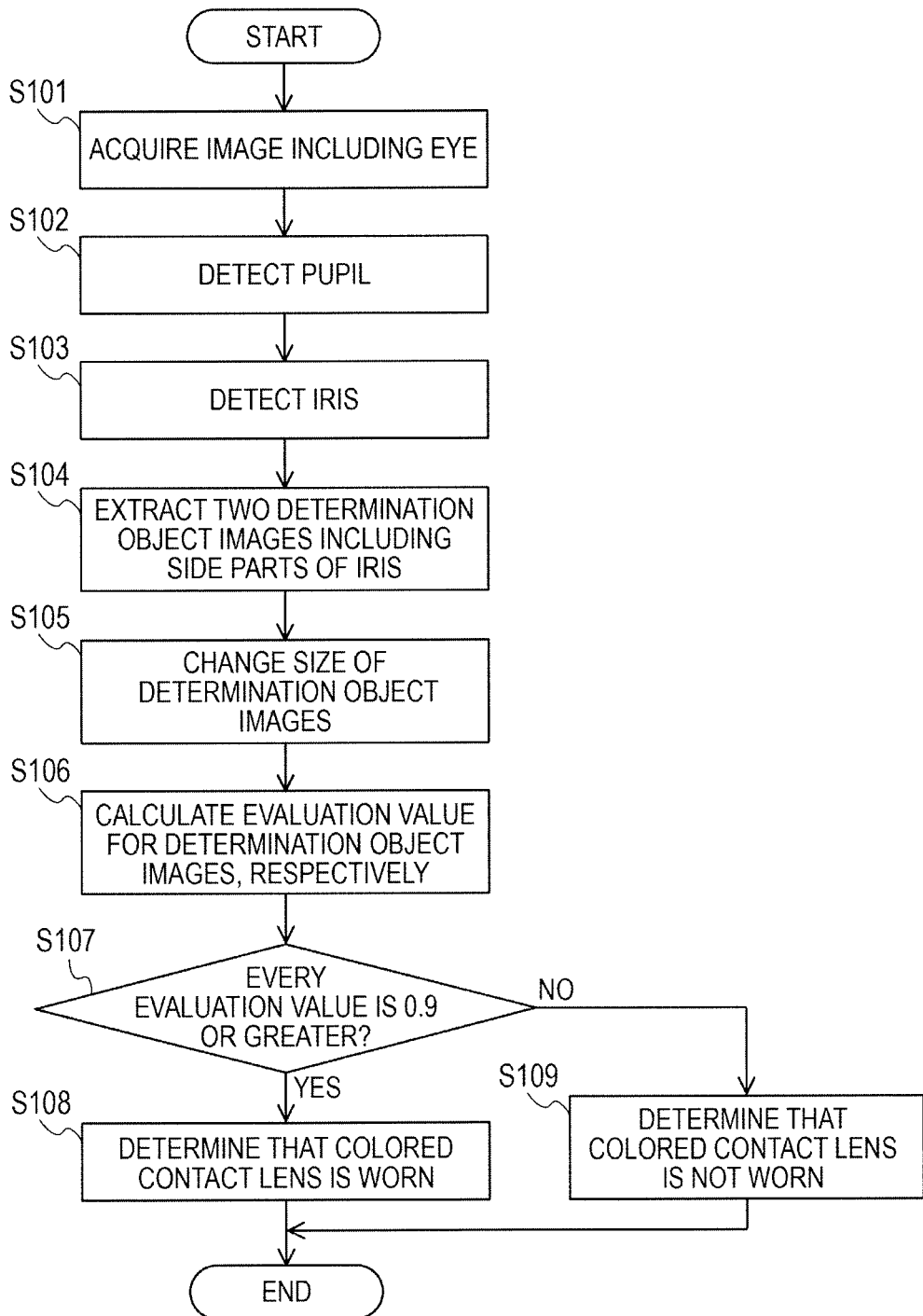
FIG. 4 is a flowchart illustrating a colored contact lens-wearing determination process according to the first example embodiment.

With reference to FIG. 4 to FIG. 7, a specific example of a colored contact lens-wearing determination process in step S100 of FIG. 3 will be described. FIG. 4 is a flowchart illustrating a colored contact lens-wearing determination process according to the first example embodiment. The process of FIG. 4 is to more specifically represent the process in step S100 of FIG. 3.

In step S101, the image acquisition unit 121 acquires an image including the user's eye. The acquired image is stored in the storage unit 133. Typically, because this image is acquired by an infrared ray, it is an image in grayscale. Further, the size of an image is 640 pixels in the horizontal direction by 480 pixels in the vertical direction, for example. However, since the size may be changed by a process described later, other sizes may be employed. Note that, in the present specification, terms expressing size such as the size of an image, the length of a subject, or the like may be defined in a standardized non-dimensional amount such as the number of pixels and are not limited to those defined in a unit having the length dimension such as mile-meter. Further, the image including the user's eye is not limited to that acquired by using an infrared ray and may be acquired by using a visible light.

In step S102, the pupil detection unit 122 detects a pupil from an image including the eye acquired in step S101 and determines the position of the pupil. The determined position of the pupil is stored in the storage unit 133. The shape of the pupil can be approximated as a circle. Thus, the position of the pupil can be expressed by the center coordinates and the radius of the pupil, for example. Note that the region of the pupil can be detected by extracting pixels having lower brightness than a predetermined value, for example.

In step S103, the iris detection unit 123 detects an iris from the image including the eye acquired in step S101 and determines the position of the iris. The position of the determined iris is stored in the storage unit 133. The pupil detection unit 122 and the iris detection unit 123 may be more generally referred to as a detection unit. The shape of an iris can be approximated as an annular shape including the pupil, and thus the position of the iris can be expressed by the center coordinates, the outer circumference radius, and the inner circumference radius of the iris, for example. Since the inner circumference radius of an iris corresponds to the radius of the pupil, it can be omitted from the information indicating the position of the iris. Note that it is possible to detect an iris by extracting a change in brightness at a boundary between the outer circumference of the iris and a sclera (so called white of eye), for example. The iris detected here includes not only the user's iris itself but also a pattern that is provided on a colored contact lens and represents an iris. Thus, in the present specification, the entire region appearing as an iris that includes an iris and a pattern provided on a colored contact lens may be referred to as an iris. Note that the order of step S102 and step S103 may be opposite. Alternatively, step S102 and step S103 may be performed in parallel or may be performed as a single process.

In step S104, the determination object image extraction unit 124 extracts two determination object images including side parts of an iris from an image including the eye acquired in step S101. The side parts of an iris here refer to portions on the outer circumference of the iris that are on the boundary to the white of eye, which are mainly the left and right parts excluding the upper and lower parts hidden behind the eyelids. The extracted determination object images are stored in the storage unit 133. These two determination object images are used for the colored contact lens-wearing determination. Extraction of determination images will be described in detail with reference to FIG. 5.

FIG. 5 is a diagram schematically illustrating extraction of determination object images according to the present example embodiment. FIG. 5 schematically illustrates an eye 90, a pupil 91, and an iris 92 included in the image acquired in step S101. The determination object image extraction unit 124 extracts two determination object images R1 and R2 from the image of the eye 90. Note that the determination object image extraction unit 124 may be simply referred to as an extraction unit.

As illustrated in FIG. 5, the determination object images R1 and R2 are extracted so as to include the left side part and the right side part of the iris 92, respectively. Each of the determination object images R1 and R2 is a square whose side has a length of S (pixel). Further, one side in the vertical direction with respect to the eye 90 of the sides of the squares is a line segment passing through the center of the iris 92. When the outer circumference radius of an iris is Ir1 (pixel), the length S of one side is set to meet S=Ir1+m. Here, the value m is a predetermined value set so that the determination object images R1 and R2 include the side parts of an iris and include neither the upper end nor the lower end of the iris 92 and is set to 30 pixels, for example.

The reason why the positions of the determination object images R1 and R2 are set in such a way will be described. A pattern of a colored contact lens often has a notable feature near the outer circumference of an iris. For example, an eye wearing a colored contact lens often has a large change in brightness between the part of the iris and the part of white of eye. Thus, inclusion of the outer circumference of an iris in the determination object images R1 and R2 for determination improves the accuracy in detecting a colored contact lens by using a determination device. Further, the upper and lower parts of an iris may be hidden behind eyelids and eyelashes. When an eyelid or an eyelash is included in the determination object images R1 and R2, the determination accuracy may deteriorate. It is therefore desirable to set the positions of the determination object images R1 and R2 so as to include the side parts of an iris and include neither the upper end nor the lower end of the iris. Further, it is desirable that one of the sides in the vertical direction of each of the squares be a line segment passing through the center of the iris 92 because wide determination object images R1 and R2 can be ensured.

Note that it is not essential that each of the determination object images R1 and R2 is a square. For example, each of the determination object images R1 and R2 may be a rectangle. That is, each shape of the determination object images R1 and R2 may be any shape that is not limited to a square or a rectangle and may be a polygon, a sector, or a figure including a curve as an example of other shapes. When the determination object images R1 and R2 have shapes other than a square, it is desirable that the length in the horizontal direction of each of the determination object images R1 and R2 with respect to the eye 90 be longer than the outer circumference radius of the iris 92 so as to include the side parts of the iris and include the iris as widely as possible.

While the determination object images R1 and R2 are acquired from the left and right parts of the iris 92, any one of them may be acquired. However, it is desirable to use the two determination object images R1 and R2 because this enables more accurate determination.

In step S105, the size change unit 125 changes the size of the determination object images R1 and R2. FIG. 6 is a diagram schematically illustrating a size change of the determination object image according to the first example embodiment. As illustrated in FIG. 6, the size change unit 125 reduces the determination object images R1 and R2 having a length of the side of S pixels to determination object images R1a and R2a having a length of the side of 32 pixels and thereby generates the determination object images R1a and R2a. The reason for changing the size is to set images to have a certain number of pixels so as to be suitable for the subsequent determination process and thereby make a process performed by a determination device described later more efficient. The determination object images R1a and R2a after the size change are stored in the storage unit 133. The length of one side being 32 pixels is an example, and the invention is not limited thereto in particular. Further, when it is not essential to limit the size in the process performed by a determination device, the process of step S105 may be omitted.

Figure 7:
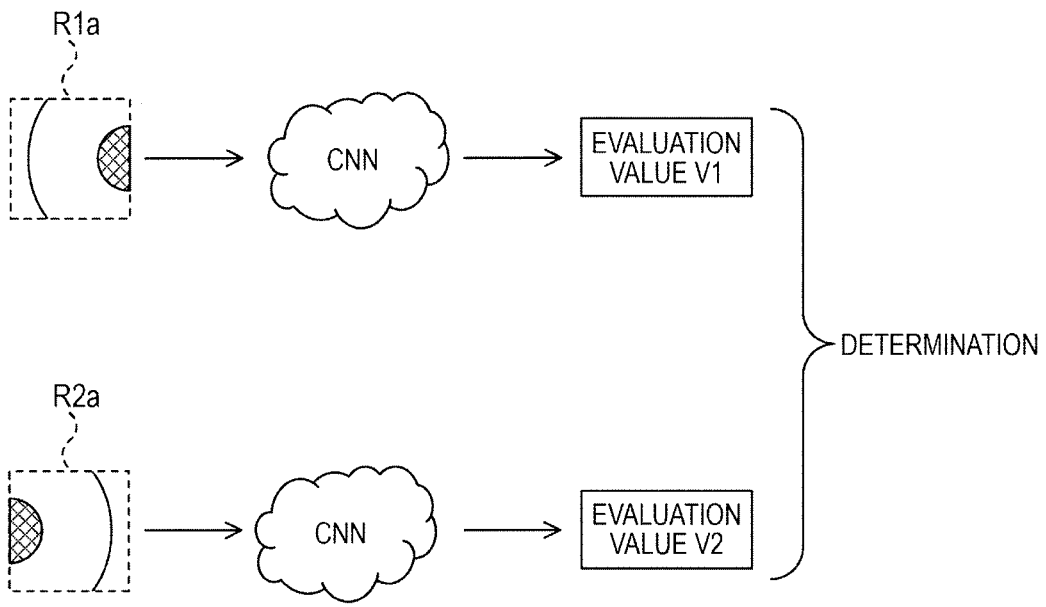
FIG. 7 is a diagram schematically illustrating a determination process according to the first example embodiment.

FIG. 7 is a diagram schematically illustrating the determination process in step S106 to step S109. The subsequent process will be described with cross reference to FIG. 4 and FIG. 7. The evaluation value calculation unit 126 that performs this process includes a determination device formed of a convolution neural network (CNN), for example. Many images including images of an eye wearing a colored contact lens and images of an eye not wearing a colored contact lens are automatically learned in advance as teacher data in the determination device, and thereby the determination device is configured to be able to determine whether or not a colored contact lens is worn. Once an image including an eye is input to the determination device, it outputs an evaluation value indicating a likelihood of a colored contact lens being worn. An evaluation value takes continuous values from 0 to 1 as an example. In this case, a higher likelihood of no colored contact lens being worn results in an evaluation value closer to 0, and a higher likelihood of a colored contact lens being worn results in an evaluation value closer to 1.

In step S106, a determination device of the evaluation value calculation unit 126 calculates two evaluation values V1 and V2 based on the two determination object images R1a and R2a, respectively. The evaluation value is stored in the storage unit 133.

From step S107 to step S109, the determination unit 127 determines whether or not a colored contact lens is worn based on the two evaluation values V1 and V2. More specifically, in step S107, the determination unit 127 determines whether or not both the evaluation value V1 and the evaluation value V2 are greater than or equal to 0.9. If both the evaluation value V1 and the evaluation value V2 are greater than or equal to 0.9 (step S107, YES), the determination unit 127 determines that a colored contact lens is worn (step S108). If at least one of the evaluation value V1 and the evaluation value V2 is less than 0.9 (step S107, NO), the determination unit 127 determines that no colored contact lens is worn (step S109).

As discussed above, in the determination process from step S106 to step S109, only when both the determination results from the two determination object images R1a and R2a indicate that a colored contact lens is worn, it is determined that a colored contact lens is worn. There are various types of colored contact lenses, and there is an individual difference in the pattern of the iris or the like. Thus, even when a sufficient amount of teacher data is used to perform learning, the determination device may make erroneous determination. Accordingly, in order to improve determination accuracy, it is desirable to input both the two determination object images R1a and R2a as described above and aggregate determination results from them to make determination.

An example of a process when the determination process from step S106 to step S109 is performed by using a single determination object image will be described. The determination device of the evaluation value calculation unit 126 calculates a single evaluation value from the single determination object image. Then, the determination unit 127 determines that a colored contact lens is worn if the evaluation value is greater than or equal to 0.9 and determines that no colored contact lens is worn if the evaluation value is less than 0.9, which enables determination as to whether or not a colored contact lens is worn. In this way, the number of determination object images may be one.

As discussed above, according to the colored contact lens-wearing determination process of the present example embodiment, by performing the determination based on a determination object image including the side part of the outer circumference of an iris, it is possible to accurately determine whether or not a colored contact lens is worn.

Note that, while the determination device with a convolution neural network is used in the determination process illustrated in FIG. 7, without being limited thereto, determination as to whether or not a colored contact lens is worn may be performed based on a change in brightness at the boundary between the outer circumference of the iris and the white of eye, for example.

Further, the determination in step S107 may be a process of determining that a colored contact lens is worn if at least one of the evaluation value V1 and the evaluation value V2 is greater than or equal to 0.9 and determining that no colored contact lens is worn if both of the evaluation value V1 and the evaluation value V2 are less than 0.9. Further, the determination in step S107 may be a process of selecting one or more evaluation values to be used in the determination out of a plurality of evaluation values such as the evaluation value V1, the evaluation value V2, and the like in accordance with the reliability or the like of the determination object image. For example, when insufficiently reliable one is included in a plurality of determination object images due to noise, it is possible to improve the determination accuracy by excluding an evaluation value of such a determination object image from the determination process. Note that, in the example described above, the threshold of 0.9 used for determination of the evaluation value V1 and the evaluation value V2 is a mere example and may be set to any value other than 0.9.

Next, a specific example of the matching accuracy improvement process in step S200 of FIG. 3 will be described with reference to FIG. 8 to FIG. 10.

Figure 8:
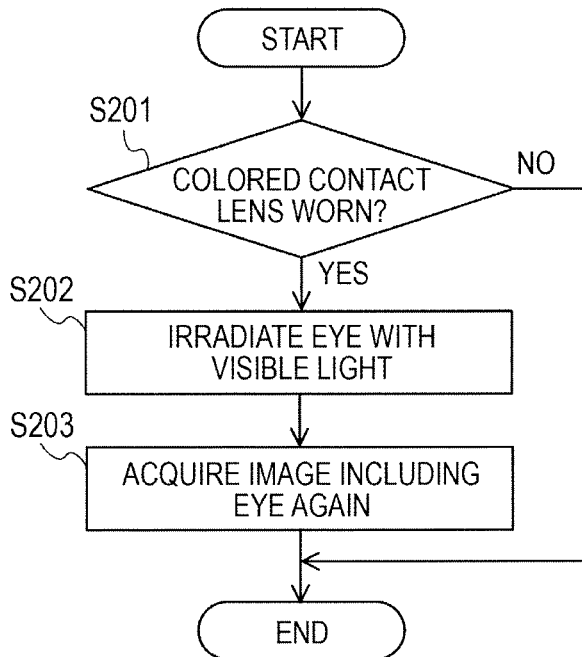
FIG. 8 is a flowchart illustrating a first example of a matching accuracy improvement process according to the first example embodiment.

FIG. 8 is a flowchart illustrating a first example of the matching accuracy improvement process according to the first example embodiment. In step S201, the processing unit 128 refers to the determination result of step S100. If it is determined that the user wears a colored contact lens (step S201, YES), the process transfers to step S202. If it is determined that the user does not wear a colored contact lens (step S201, NO), the process ends.

In step S202, the processing unit 128 controls the visible light irradiation device 108 to irradiate the user' eye with a visible light. Then, in step S203, the processing unit 128 causes the image acquisition unit 121 to again acquire an image including the eye.

When a retina of the eye is irradiated with a visible light, a pupillary light reflex occurs that causes a pupil to contract. This results in a wider iris region and a wider area in which the pattern of the iris can be acquired. Therefore, deterioration in accuracy of iris matching due to a colored contact lens can be reduced. Further, in the present example, since an unconscious reflex is utilized, the recognition subject is not required to take any action. For example, the present example can be applied to a case where it is difficult to make the recognition subject to take some action, such as when the recognition subject is not cooperative in iris matching or when the recognition subject does not understand the language, such as in a situation of identity verification in a government office.

Even when either one of the eyes is irradiated with a visible light, contraction of the pupil due to a pupillary light reflex occurs in both the eyes. Thus, the eye irradiated with a visible light and the eye used for again acquiring an image may be different. This can suppress the influence of a reflex caused by the irradiated visible light.

FIG. 9 is a flowchart illustrating a second example of the matching accuracy improvement process according to the first example embodiment. The description of the same process as that in FIG. 8 will be omitted as appropriate. In step S204, the processing unit 128 causes the display unit 129 to display a message that prompts the user to look at a bright object. An example of a specific message may be "To authenticate once more, please look at something bright and then look at camera again." After the user looks at a bright object in response to this message, in step S203, the processing unit 128 causes the image acquisition unit 121 to again acquire an image including the eye.

Also in the present example, because the user looks at a bright object, a pupillary light reflex causes the pupil to contract and the region of the iris to be wider. It is therefore possible to reduce deterioration in accuracy of iris matching due to a colored contact lens. In the present example, unlike the first example described above, it is possible to perform the matching accuracy improvement process utilizing a pupillary light reflex even when the visible light irradiation device 108 is not provided. Note that the message may have a content that specifically indicates a thing to look at such as "To authenticate once more, please once look at lighting and then look at camera again."

An example in which the matching accuracy is significantly improved in the configuration utilizing contraction of the pupil in FIG. 8 and FIG. 9 will be described. If it is determined that a colored contact lens is worn in step S100, a process of excluding a part near the outer circumference of the iris from the extraction range of the feature amount may be performed in the iris matching in step S300. At this time, there may be a problem of decrease in the region contributing to extraction of a feature amount and thus a reduction in the accuracy of iris matching. In such a situation, by performing the process of FIG. 8 and FIG. 9 to cause the pupil to contract, it is possible to increase not the area near the outer circumference of the iris but the opposite side, namely, the area of the inner circumference side of the iris. This enables accurate iris matching even when a part near the outer circumference of the iris is excluded from the extraction range of a feature amount.

FIG. 10 is a flowchart illustrating a third example of the matching accuracy improvement process according to the first example embodiment. The description of same process as that in FIG. 8 will be omitted as appropriate. In step S205, the processing unit 128 causes the display unit 129 to display a message that prompts the user to blink. A specific example of the message may be "To authenticate once more, please blink and then look at camera again." After the user blinks in response to this message, in step S206, the processing unit 128 causes the image acquisition unit 121 to additionally acquire an image including the eye.

In the present example, the user is caused to blink and thereby the colored contact lens rotates, and the position of the pattern of the colored contact lens changes before and after the blinking. On the other hand, the pattern of the iris itself of the user's eye does not change by a blinking. Therefore, by calculating a difference between two images acquired before and after a blinking, it is possible to separate the pattern of the colored contact lens from the pattern of the iris of the user's eye and thus perform accurate matching by extracting the pattern of the iris of the user's eye. It is therefore possible to reduce deterioration in accuracy of iris matching due to a colored contact lens.

Also in the present example, the accuracy improvement process can be performed. In the present example, since a pupillary light reflex caused by a change in brightness is not utilized, there is an advantage of the effect being not lost even in a bright place.

Note that the process in the flowchart of FIG. 10 may be modified into a process of repeating the process of step S206 for multiple times to acquire images for multiple times. Furthermore, in this case, the process of step S205 may be omitted. Since a human blinks unconsciously, such an unconscious blinking may cause rotation of the colored contact lens even without display of a message that prompts the user to blink. Therefore, even without displaying a message, repeated acquisition of images may enable acquisition of images used for separating the pattern of the colored contact lens and the pattern of the iris of the user's eye from each other, and in this case, the same effect and advantage as that described above can be obtained.

Figure 11:
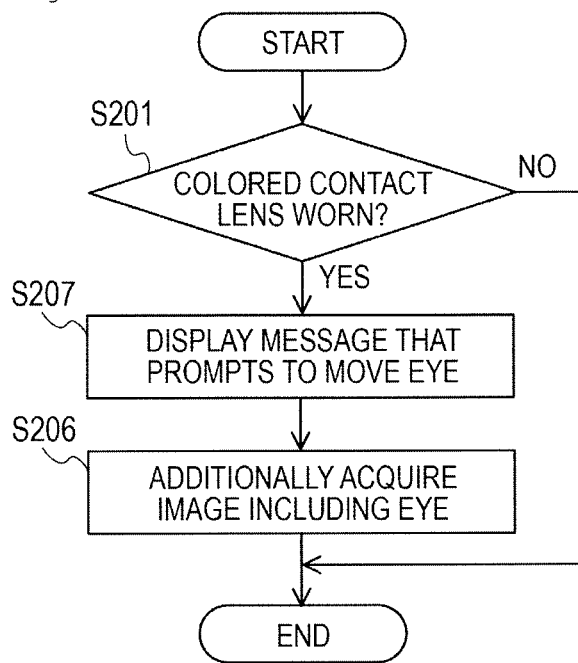
FIG. 11 is a flowchart illustrating a modified example of a third example of a matching accuracy improvement process according to the first example embodiment.

FIG. 11 is a flowchart illustrating a modified example of the third example of the matching accuracy improvement process according to the first example embodiment. As illustrated in step S207 of FIG. 11, the content of the message may be to prompt the user to move the eye such as an instruction of looking right and left. A specific example of the message may be "To authenticate once more, please look right and left and then look at camera again." Since motion of the eyeball causes rotation of the colored contact lens, the same effect and advantage as that of the case of prompting a blinking as described above can be obtained also in the present modified example.

As discussed above, according to the matching accuracy improvement process of the present example embodiment, it is possible to reduce deterioration in accuracy of iris matching due to a colored contact lens being worn.

Note that, while the user is notified of various messages by display on the display unit 129 in the processes described above, a method of notification of the message is not limited thereto. For example, voice may be used for notification of the message.

Figure 12:
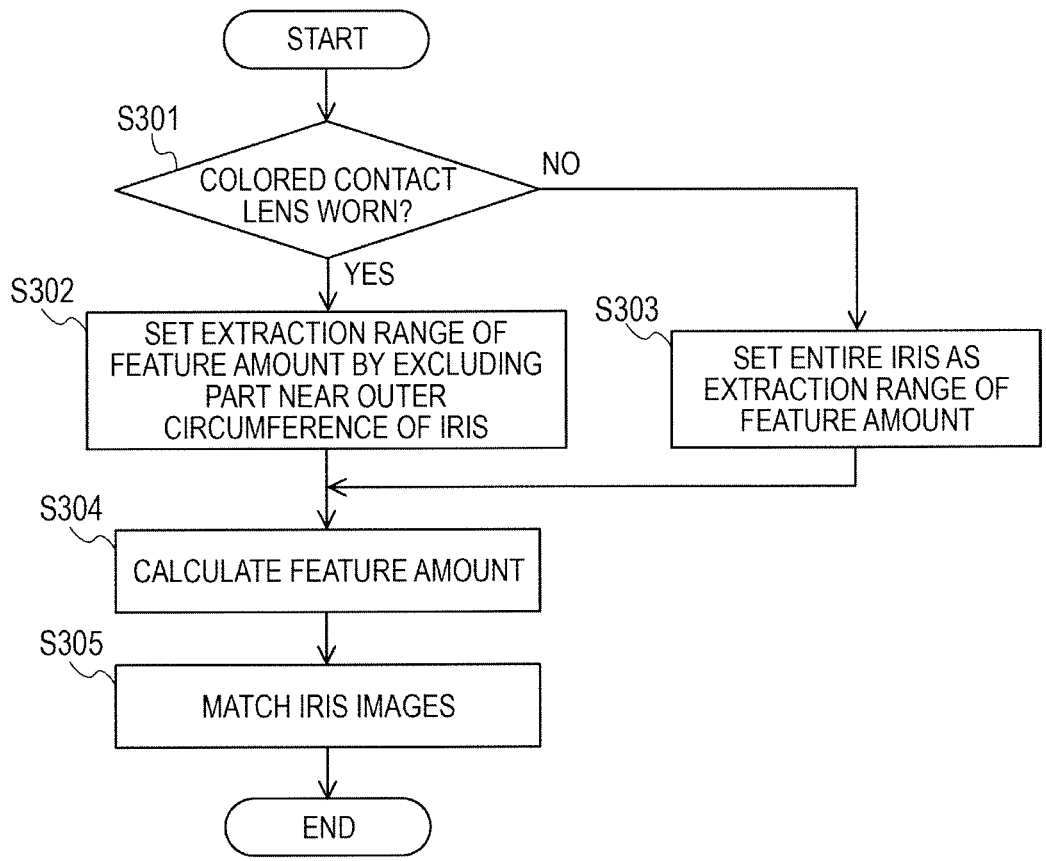
FIG. 12 is a flowchart illustrating an iris matching process according to the first example embodiment.
Figure 13:
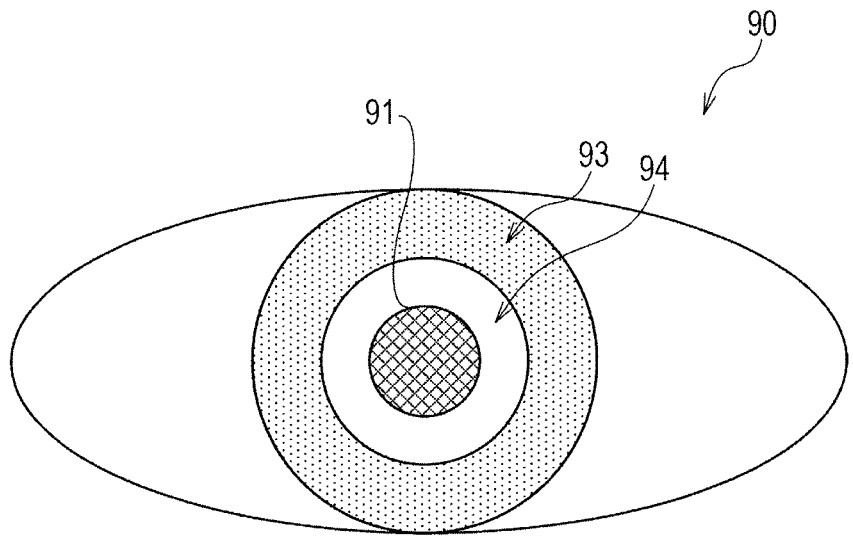
FIG. 13 is a diagram schematically illustrating a setting of an extraction range of a feature amount according to the first example embodiment.

A specific example of the iris matching process in step S300 of FIG. 3 will be described with reference to FIG. 12 and FIG. 13. FIG. 12 is a flowchart illustrating the iris matching process according to the first example embodiment. The process of FIG. 12 is more specific version of the process of step S300 of FIG. 3.

In step S301, the extraction range setting unit 130 refers to the determination result of step S100. If it is determined that the user wears a colored contact lens (step S301, YES), the process transfers to step S302. If it is determined that the user does not wear a colored contact lens (step S301, NO), the process transfers to step S303.

In step S302, the extraction range setting unit 130 excludes a part near the outer circumference of the iris to set an extraction range of a feature amount. FIG. 13 is a diagram schematically illustrating a setting of the extraction range of the feature amount according to the first example embodiment. As illustrated in FIG. 13, the region of the iris in an image is divided into a mask region 93 and a feature amount extraction region 94. The mask region 93 is a region defined in accordance with a position of the outer circumference and the inner circumference of the iris, which is, out of the region of the iris, a range from which no feature amount used for the subsequent matching process is extracted. The feature amount extraction region 94 is, out of the region of the iris, a region from which a feature amount is extracted and which is a range except the mask region 93. The mask region 93 is arranged near the outer circumference of the iris. That is, the feature amount extraction region 94 is a range excluding a predetermined range including the outer circumference of the iris.

The range of the mask region 93 is defined as a ring including the outer circumference end of the iris and having a width of 60 percent or more from the outer circumference to the inner circumference of the iris. More specifically, the mask region 93 is a ring having an outer circumference radius is Ir1 and an inner circumference radius is $\{Ir2+0.4\times(Ir1-Ir2)\}$, where the outer circumference radius of the iris is Ir1 and the inner circumference radius of the iris is Ir2.

The reason for defining the mask region 93 and the feature amount extraction region 94 will be described. In a colored contact lens, many colored portions (pattern) are arranged in a portion corresponding to a part near the outer circumference of an iris. Thus, when a feature amount is extracted from a region including a part near the outer circumference of the iris to perform iris authentication with a colored contact lens being worn, iris matching is performed with the pattern of the colored contact lens overlapping with the pattern of the iris, and therefore this causes a problem of a reduction in matching accuracy. For example, the same person may be determined as another person because the pattern of the iris not wearing a colored contact lens taken at registration does not match the pattern taken at the matching with the pattern of the colored contact lens overlapping with the pattern of the iris.

By defining the feature amount extraction region 94 as a range excluding a predetermined range including the outer circumference of the iris, a part near the outer circumference of the iris in which many patterns of the colored contact lens are arranged is excluded from the extraction of a feature amount. On the other hand, no pattern may be arranged in a region of the colored contact lens corresponding to a part near the inner circumference of the iris in many cases in order to ensure a field of view, which less affects iris matching. It is thus possible to reduce deterioration in accuracy of iris matching due to a colored contact lens being worn.

In step S303 when the user does not wear a colored contact lens, the mask region 93 is not provided, and the feature amount extraction region 94 is set for the entire iris. When no colored contact lens is worn, it is not necessary to exclude a part near the outer circumference from the feature amount extraction region, rather, no exclusion of a part near the outer circumference allows for a wider feature amount extraction region and thus enables higher matching accuracy. It is therefore desirable to perform different process depending on whether or not a colored contact lens is worn.

In step S304, the feature amount calculation unit 131 uses the patterns of the iris included in an image of the set feature amount extraction region 94 or the like to calculate a feature amount. The calculated feature amount is stored in the storage unit 133.

In step S305, the matching unit 132 matches the feature amount acquired in step S304 against a feature amount of an iris of a user registered in advance in the storage unit 133. When it is determined as the iris of the same person by matching, the iris recognition system 10 determines that the identity verification is completed and performs a process of login or the like.

As discussed above, according to the iris matching process of the present example embodiment, by defining a range excluding a predetermined range including the outer circumference of the iris as an extraction range of a feature amount, it is possible to reduce influence on matching accuracy when the recognition subject wears a colored contact lens.

When excluding a part near the outer circumference of the iris to set the feature amount extraction region 94 by using the scheme of step S302, it is more effective to combine any of the matching accuracy improvement processes illustrated by using FIG. 8 and FIG. 9. In the scheme of step S302, the feature amount extraction region 94 is reduced by the area of the mask region 93. Using the process of FIG. 8 or FIG. 9 together, it is possible to increase the range of the iris and therefore compensate the influence of the reduced feature amount extraction region 94.

In the process described above, since the mask region 93 is determined independently of the pattern of a colored contact lens, there is no need to perform a process of detecting the pattern of the colored contact lens, which enables a high speed process. When the accuracy is more important than the processing speed, however, a process of determining a colored portion of a colored contact lens by determining the pattern of the colored contact lens and the pattern of an iris itself of the user may be added. In this case, the colored portion of the colored contact lens is set as the mask region 93. In such a way, when the colored portion of a colored contact lens (the shape of the pattern or the region where the pattern is arranged) can be determined, the mask region 93 that is a region near the outer circumference of the iris when iris matching is performed can be set based on the colored portion of the colored contact lens.

As an example of the process of determining the pattern of a colored contact lens and the pattern of an iris itself of the user, there may be a scheme of searching for the contour of the pattern of the colored contact lens by using an adaptive contour model such as a snakes method or a Level Set method. Further, as another example, there may be a scheme of dividing an iris into a plurality of rectangular regions and using a convolutional neural network for each rectangular region to determine whether or not there is a pattern of a colored contact lens, a scheme of detecting whether or not there are regular figures on a concentric circle, a scheme of detecting whether or not there are radial straight lines, or the like.

The device described in the above example embodiment can be also configured as a second example embodiment to a fourth example embodiment illustrated below.

Second Example Embodiment

Figure 14:
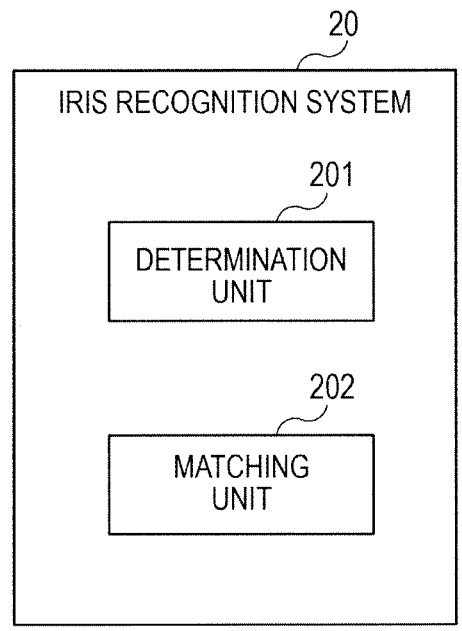
FIG. 14 is a function block diagram of an iris recognition system according to a second example embodiment.

FIG. 14 is a function block diagram of an iris recognition system 20 according to the second example embodiment. The iris recognition system 20 has a determination unit 201 and a matching unit 202. The determination unit 201 determines whether or not a colored contact lens is worn based on an image including an eye of a recognition subject. The matching unit 202 performs matching of the iris by using a feature amount extracted from a region excluding a predetermined range including the outer circumference of the iris out of the region of the iris included in the image when it is determined by the determination unit 201 that a colored contact lens is worn.

According to the present example embodiment, the iris recognition system 20 that can reduce influence on the matching accuracy when the recognition subject wears a colored contact lens can be provided.

Third Example Embodiment

Figure 15:
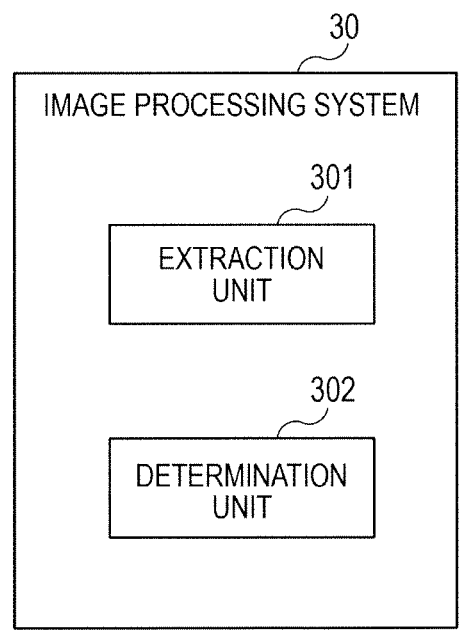
FIG. 15 is a function block diagram of an image processing system according to a third example embodiment.

FIG. 15 is a function block diagram of an image processing system 30 according to the third example embodiment. The image processing system 30 has an extraction unit 301 and the determination unit 302. The extraction unit 301 extracts a determination object image including a side part of the outer circumference of an iris from an image including an eye. The determination unit 302 determine whether or not a colored contact lens is worn based on the determination object image.

According to the present example embodiment, the image processing system 30 that can accurately determine whether or not a colored contact lens is worn can be provided.

Fourth Example Embodiment

Figure 16:
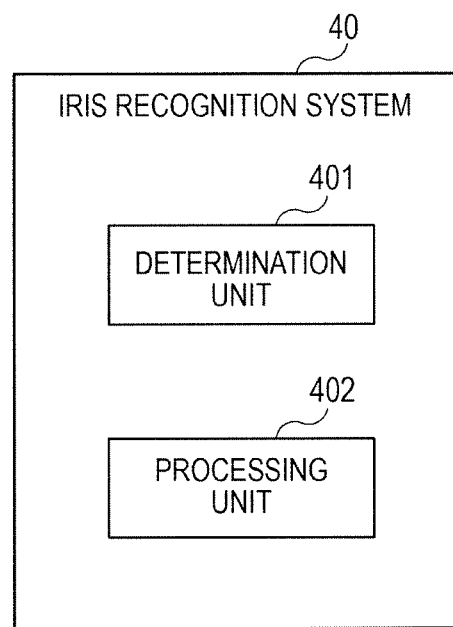
FIG. 16 is a function block diagram of an iris recognition system according to a fourth example embodiment.

FIG. 16 is a function block diagram of an iris recognition system 40 according to the fourth example embodiment. The iris recognition system 40 has a determination unit 401 and the processing unit 402. The determination unit 401 determines whether or not a colored contact lens is worn based on an image including an eye of a recognition subject. The processing unit 402 performs a process of improving accuracy of iris matching on the recognition subject when it is determined by the determination unit 401 that a colored contact lens is worn.

According to the present example embodiment, the iris recognition system 40 that can reduce deterioration in accuracy of iris matching due to a colored contact lens being worn can be provided.

Modified Example Embodiments

The present invention is not limited to the example embodiments described above and can be changed as appropriate within the scope not departing from the spirit of the present invention.

The iris recognition systems of the example embodiments described above may be used not only for authentication at login illustrated as an example but also for various identity verification. For example, the iris recognition systems of the example embodiments described above may be applied to identity verification for immigration at an airport, a seaport, or a national border, identity verification at a government office, identity verification for access to a factory or an office, identity verification at entrance to an event hall, or the like.

In each example embodiment described above, acquisition of an image used for iris matching may be performed on one eye or may be performed on both eyes of an authentication subject. Acquisition of an image of only one eye has the advantage of improvement of the processing speed or reduction in the storage capacity, and acquisition of images of both eyes has the advantage of improvement of authentication accuracy.

In each example embodiment described above, a situation where a feature amount of an acquired image of an iris is matched against a feature amount of an iris which has been registered in advance, that is, a process of iris matching has been described as an example. However, each example embodiment described above can be applied to a situation of registration of an image of an iris or a feature amount of an iris with appropriate modification. Specifically, with the iris matching process of step S300 being replaced with the iris registration process, modification can be made for the situation of registration. In this case, the iris registration process may be a process of acquiring an image of an iris, calculating a feature amount, and storing the feature amount of the iris, for example.

While the process of step S202, S204, or S205 is performed when it is determined that the user wears a colored contact lens in the process of step S201 in each example embodiment described above, this process may be other process than is illustrated. For example, it may be a process that, when it is determined that the user wears a colored contact lens, displays a message instructing the user to put off the colored contact lens. Alternatively, when it is determined that the user wears a colored contact lens, a failure of matching or registration may be determined. In this case, the process may notify the user of a failure of the process by a message, an alarm, or the like to prompt another matching or registration or may notify the user of a failure of the process to end the process. Note that these processes may be performed instead of the process of step S202, S204, or S205 or may be performed in parallel with the process of step S202, S204, or S205.

As described above, the advantage of instructing the user to put off the colored contact lens or performing the process as matching or registration being failed will be described with an example of a situation of iris registration. Since the importance of identity verification is high in a situation of iris registration, it is necessary to enhance reliability of a registered iris being the person in question. In particular, this requirement for reliability is more significant in a situation of important authentication such as immigration control or national identification (ID). Registration with a colored contact lens being worn will impair the function of identity verification. Thus, when registration is attempted with a colored contact lens being worn, the reliability of identity verification can be maintained by issuing some alert and disabling registration. This improves the accuracy of an iris recognition system. Further, multiple registration using a colored contact lens may be prevented.

The scope of each example embodiment also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, a floppy (registered trademark) disk, a hard disk, an optical disk, a magneto-optical disk, a Compact Disk (CD)-ROM, a magnetic tape, a non-volatile memory card, or a ROM, for example, may be used. The scope of each example embodiment includes not only those executing a process with a program itself stored in the storage medium but also those operating on an operating system (OS) in cooperation with the function of another software or an extension board to execute the process.

Services realized by the function of each example embodiment described above can be provided to the user in a form of Software as a Service (SaaS).

Note that all the example embodiments described above are mere examples of embodiment in implementing the present invention, and the technical scope of the present invention should not be limited to these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An image processing system comprising:

an extraction unit that extracts a determination object image including a side part of an outer circumference of an iris from an image including an eye; and a determination unit that determines whether or not a colored contact lens is worn based on the determination object image.

(Supplementary Note 2)

The image processing system according to supplementary note 1, wherein the determination object image includes neither an upper end nor a lower end of the outer circumference of the iris.

(Supplementary Note 3)

The image processing system according to supplementary note 1 or 2, wherein a length in a horizontal direction of the determination object image with respect to the eye is longer than an outer circumference radius of the iris.

(Supplementary Note 4)

The image processing system according to supplementary note 3,
wherein the determination object image is square, and
wherein a side of the square has a length obtained by adding a predetermined value to the outer circumference radius of the iris.

(Supplementary Note 5)

The image processing system according to supplementary note 4, wherein the side of the square is a line segment passing through a center of the iris.

(Supplementary Note 6)

The image processing system according to any one of supplementary notes 1 to 5 further comprising an evaluation value calculation unit that includes a determination device formed of a convolution neural network and calculates, by inputting the determination object image into the determination device, an evaluation value indicating a likelihood of the colored contact lens being worn.

(Supplementary Note 7)

The image processing system according to any one of supplementary notes 1 to 5, wherein the determination unit determines whether or not the colored contact lens is worn based on a change in brightness at a boundary between the outer circumference of the iris and a white of the eye.

(Supplementary Note 8)

The image processing system according to any one of supplementary notes 1 to 7 further comprising a size change unit that changes a number of pixels of the determination object image into a predetermined number of pixels prior to the determination by the determination unit.

(Supplementary Note 9)

The image processing system according to any one of supplementary notes 1 to 8, wherein the extraction unit extracts two determination object images including both sides of the outer circumference of the iris, respectively.

(Supplementary Note 10)

The image processing system according to any one of supplementary notes 1 to 9, the determination unit determines that the colored contact lens is worn when both of two determination object images indicate that the colored contact lens is worn.

(Supplementary Note 11)

The image processing system according to any one of supplementary notes 1 to 9, the determination unit determines that the colored contact lens is worn when at least one of two determination object images indicates that the colored contact lens is worn.

(Supplementary Note 12)

An image processing method comprising:
extracting a determination object image including a side part of an outer circumference of an iris from an image including an eye; and
determining whether or not a colored contact lens is worn based on the determination object image.

(Supplementary Note 13)

A storage medium in which a program is stored, the program causing a computer to execute:
extracting a determination object image including a side part of an outer circumference of an iris from an image including an eye; and
determining whether or not a colored contact lens is worn based on the determination object image.

This application is based upon and claims the benefit of priority from Japanese Patent Application No. 2017-165404, filed on Aug. 30, 2017, the disclosure of which is incorporated herein in its entirety by reference.

REFERENCE SIGNS LIST 10, 20, 40 iris recognition system
30 image processing system
90 eye
91 pupil
92 iris
93 mask region
94 feature amount extraction region
121 image acquisition unit
122 pupil detection unit
123 iris detection unit
124 determination object image extraction unit
125 size change unit
126 evaluation value calculation unit
127, 201, 302, 401 determination unit
128, 402 processing unit
129 display unit
130 extraction range setting unit
131 feature amount calculation unit
132, 202 matching unit
133 storage unit
301 extraction unit
R1, R2, R1a, R2a determination object image

The invention claimed is:

1. An image processing system comprising:
a memory configured to store instructions: and a processor configured to execute the instructions to:
extract an object image including a side portion of an outer circumference of an iris and a white portion of an eye from an image including the eye;
detect brightness at the side portion of the outer circumference of the iris and brightness at the white portion from the object image; and
determine whether a contact lens is covering the iris based on a change between the detected brightness at the side portion of the outer circumference of the iris and the detected brightness at the white portion.

2. The image processing system according to claim 1, wherein the object image includes neither an upper portion nor a lower portion of the outer circumference of the iris.

3. The image processing system according to claim 1, wherein a length in a horizontal direction of the object image with respect to the eye is longer than an outer circumference radius of the iris.

4. The image processing system according to claim 3, wherein the object image is rectangle, and
wherein a side of the rectangle has a length obtained by adding a predetermined value to the outer circumference radius of the iris.

5. The image processing system according to claim 4, wherein the side of the rectangle is a line segment passing through a center of the iris.

6. The image processing system according to claim 1, wherein the processor is further configured to calculate, based on the object image and a convolutional neural network, an evaluation value indicating a likelihood of the contact lens covering the iris.

7. The image processing system according to claim 1, wherein the processor is further configured to change a number of pixels of the object image into a predetermined number of pixels prior to determining whether the contact lens is covering the iris based on the object image.

8. The image processing system according to claim 1, wherein the processor is further configured to extract two object images including both sides of the outer circumference of the iris, respectively.

9. The image processing system according to claim 8, wherein the processor is further configured to determine that the contact lens is covering the iris when at least one of the two object images indicates that the colored contact lens is covering the iris.

10. The image processing system according to claim 8, wherein the processor is further configured to determine that the contact lens is covering the iris when both of the two object images indicate that the contact lens is covering the iris.

11. A non-transitory computer readable medium having stored therein a program for extracting an object image including a side portion of an outer circumference of an iris and a white portion of an eye from an image including the eye;

detecting brightness at the side portion of the outer circumference of the iris and brightness at the white portion from the object image; and determining whether a contact lens is covering the iris based on a change between the detected brightness at the side portion of the outer circumference of the iris and the detected brightness at the white portion.

12. An image processing method comprising:

extracting an object image including a side portion of an outer circumference of an iris and a white portion of an eye from an image including the eye;

detecting brightness at the side portion of the outer circumference of the iris and brightness at the white portion from the object image; and determining whether a contact lens is covering the iris based on a change between the detected brightness at the side portion of the outer circumference of the iris and the detected brightness at the white portion.

* * * * *